United States Patent [19]

Hunter

[11] 4,217,230

[45] Aug. 12, 1980

[54] SECONDARY RECOVERY PROCESS

[75] Inventor: Walter D. Hunter, Houston, Tex.

[73] Assignee: Texaco Development Corporation, White Plains, N.Y.

[21] Appl. No.: 917,050

[22] Filed: Jun. 19, 1978

[51] Int. Cl.² .................................... E21B 43/22
[52] U.S. Cl. .................. 252/8.55 D; 166/275; 526/287
[58] Field of Search ............ 252/8.55 D; 526/287; 166/274, 275

[56] References Cited

U.S. PATENT DOCUMENTS

| | | | |
|---|---|---|---|
| 2,131,142 | 9/1938 | Orthner et al. | 260/410.6 X |
| 2,233,381 | 2/1941 | DeGroote et al. | 252/8.55 |
| 2,348,705 | 5/1944 | Alderman et al. | 526/287 |
| 3,085,063 | 4/1963 | Turbak | 252/8.55 |
| 4,110,224 | 8/1978 | Allen | 252/8.55 |

*Primary Examiner*—Herbert B. Guynn
*Attorney, Agent, or Firm*—Carl G. Ries; Thomas H. Whaley; Walter D. Hunter

[57] ABSTRACT

Hydrocarbons are recovered from a subterranean hydrocarbon-bearing formation penetrated by an injection well and a production well by displacing hydrocarbons toward the production well using a drive fluid such as water thickened with a polymer comprising repeating units of vinyl sulfonic acid alkoxylated with 2,3-epoxy-1-propanol. Optionally, the drive fluid can be saturated with carbon dioxide and/or natural gas at the injection pressure.

10 Claims, No Drawings

SECONDARY RECOVERY PROCESS

BACKGROUND OF THE INVENTION

1. Field of the Invention

This invention relates to a process for recovering hydrocarbons from a subterranean hydrocarbon-bearing formation penetrated by an injection well and a production well wherein a drive fluid such as water thickened with a polymer comprising repeating units of vinyl sulfonic acid alkoxylated with 2,3-epoxy-1-propanol is utilized to displace hydrocarbons in the formation toward a production well.

2. Prior Art

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70-80 percent of the original hydrocarbons in place.

Thus, many large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30-50 percent of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery of this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes. Another disadvantage is the tendency of the aqueous drive fluid to remove additional gas by diffusion from the in-place oil thus further reducing the already lowered formation oil volume and increasing the viscosity of the oil.

There is a definite need in the art for a water flooding process in which the disadvantages discussed above are largely eliminated or avoided.

SUMMARY OF THE INVENTION

This invention relates to a process for recovering hydrocarbons from a subterranean hydrocarbon-bearing formation penetrated by an injection well and a production well which comprises:

(A) injecting into the formation via an injection well a drive fluid comprising water having dissolved therein a small amount of a water-soluble polymer comprising repeating units of vinyl sulfonic acid alkoxylated with 2,3-epoxy-1-propanol, (B) forcing the said fluid through the formation and (C) recovering hydrocarbons through the production well.

An additional embodiment of this invention relates to the drive fluid compositions utilized in step (a) which may, if desired, be saturated with carbon dioxide and/or natural gas.

DETAILED DESCRIPTION OF THE INVENTION

Prior to practicing the process of this invention it is sometimes desirable to open up a communication path through the formation by a hydraulic fracturing operation. Hydraulic fracturing is a well-known technique for establishing a communication path between an injection well and a production well. Fracturing is usually accomplished by forcing a liquid such as water, oil or any other suitable hydrocarbon fraction into the formation at pressure of from about 300 to about 3000 psig which are sufficient to rupture the formation and to open up channels therein. By use of this method it is possible to position the fracture at any desired vertical location with respect to the bottom of the oil-filled zone. It is not essential that the fracture planes be horizontally oriented, although it is, of course, preferably that they be. After the fracture has been established, and without diminishing the fracture pressure, a propping agent may be injected into the fraction in order to prevent healing of the fracture which would destroy its usefulness for fluid flow communication purposes. Gravel, metal shot, glass beads, sand, etc. and mixtures thereof are generally employed as propping agents. When sand is utilized as the propping agent particles having a Tyler mesh size of from about 8 to about 40 are preferred (i.e., from about 0.016 to about 0.093 inches).

The water-soluble polymers utilized in the drive fluids of this invention comprise repeating units of alkoxylated vinyl sulfonic acid. Generally, the number average molecular weight of the alkoxylated vinyl sulfonic acid polymers will range from about 10,000 to about 2,000,000 or more. The alkoxylated vinyl sulfonic acid polymers can be prepared by the usual vinyl compound polymerization methods at temperatures of about 30° to about 100° C. employing a suitable polymerization catalyst such as azo-bis(isobutyronitrile), ammonium persulfate, etc. The preparation of such vinyl-type polymers is described in detail in Norton et al U.S. Pat. No. 3,779,917 and in DePaolo U.S. Pat. No. 3,405,003 which are incorporated herein in their entirety by reference.

The alkoxylated vinyl sulfonic acid monomers employed in preparing the polymers of alkoxylated vinyl sulfonic acid useful in this invention comprise vinyl sulfonic acid alkoxylated with from about 2 to about 100 percent by weight of 2,3-epoxy-1-propanol (i.e., glycidol).

The alkoxylation of vinyl sulfonic acid can be conveniently conducted using methods well known in the art.

For example, an aqueous solution of the vinyl sulfonic acid comprising about 10 to about 30 weight percent or more of the copolymer in water along with about 0.5 weight percent or more of powdered potassium hydroxide or sodium hydroxide is charged to an autoclave and the autoclave and contents heated to a temperature of about 125° to about 200° C. after which the required weight of 2,3-epoxy-1-propanol is pressured with nitrogen into the autoclave over a period of 1 to about 3 hours or more following which the autoclave is allowed to cool to room temperature and then vented. The reaction product remaining is then stripped to remove unreacted materials, etc. to yield the water-soluble, alkoxylated vinyl sulfonic acid.

A number of other methods are set out in the art for conducting such alkoxylation reactions including those described in U.S. Pat. Nos. 2,213,477, 2,233,381; 2,131,142; 3,879,475; 2,174,761; 2,425,845 and 3,062,747.

The following example which illustrates the preparation of the alkoxylated vinyl sulfonic acid is to be considered not limitative.

EXAMPLE I

A total of 450 cc of water, 6 g. of powdered potassium hydroxide and 52 g. of a vinyl sulfonic acid are added to an autoclave which is then heated to a temperature of 120° C. Glycidol in the amount of 37 g. is added to the autoclave under nitrogen pressure over a 1.1 hour period during which time the temperature of the autoclave is maintained at 115° C. Next, the autoclave and contents are allowed to cool to room temperature after which the autoclave is vented. The reaction mixture is then stripped of volatiles using a nitrogen purge. The resulting water-soluble product is vinyl sulfonic acid alkoxylated with about 41 weight percent of glycidol.

The following example illustrates the preparation of an alkoxylated vinyl sulfonic acid polymer and is to be considered not limitative.

EXAMPLE II

A reaction flask equipped with a moderate speed stirrer is charged with 110 parts by weight of vinyl sulfonic acid alkoxylated with 52 weight percent of glycidol prepared as described in Example I, 220 parts by weight of ethanol and 0.70 parts by weight of azobis(isobutyronitrile). The reaction mixture is then flushed with carbon dioxide to remove oxygen following which the polymerization is conducted for 20.5 hours at 63° C. Next the reaction mixture is stripped of volatiles using a nitrogen purge yielding the alkoxylated vinyl sulfonic acid polymer which exhibits a number average molecular weight of about 95,000.

In the secondary recovery process of this invention, generally the aqueous drive fluid will contain from about 0.1 to about 5.0 weight percent or more of the alkoxylated vinyl sulfonic acid polymer. Optionally, the aqueous drive fluid may be saturated with carbon dioxide and/or natural gas at the injection pressure which generally will be from about 300 to about 3000 psig or more.

If desired, the aqueous drive fluid having dissolved therein the above-described polymeric thickening agent may be made alkaline by addition of an alkaline agent. The advantageous results achieved with the aqueous alkaline medium used in the process of this invention are believed to be derived from the wettability improving characteristics of the alkaline agent.

Useful alkaline agents include compounds selected from the group consisting of alkali metal hydroxides, alkaline earth metal hydroxides, and the basic salts of the alkali metal or alkaline earth metals which are capable of hydrolyzing in an aqueous medium to give an alkaline solution. The concentration of the alkaline agent employed in the drive fluid is generally from about 0.005 to about 0.3 weight percent. Also, alkaline materials such as sodium hypochlorite are highly effective as alkaline agents. Examples of these especially useful alkaline agents include sodium hydroxide, potassium hydroxide, lithium hydroxide, ammonium hydroxide, sodium hypochlorite, potassium hypochlorite, sodium carbonate and potassium carbonate.

A wide variety of surfactants such as alkylaryl sulfonates, alkyl polyethoxylated sulfates, etc. may also be included as a part of the aqueous drive fluid composition. Generally about 0.001 to about 1.0 or more weight percent of the surfactant will be included in the drive fluid.

This invention is best understood by reference to the following example which is offered only as an illustrative embodiment of this invention and is not intended to be limitative.

EXAMPLE III

In a field in which the primary production has already been exhausted, an injection well is completed in the hydrocarbon-bearing formation and perforations are formed between the interval of 6540-6555 feet. A production well is drilled approximately 435 feet distance from the injection well, and perforations are similarly made in the same hydrocarbon-bearing formation at 6545-6560 feet.

The hydrocarbon-bearing formation in both the injection well and the production well is hydraulically fractured using conventional techniques, and a gravel-sand mixture is injected into the fracture to hold it open and prevent healing of the fracture.

In the next step water at a temperature of 65° F. saturated with carbon dioxide at about 1300 psig to which there has been added about 0.17 weight percent sodium hydroxide and containing dissolved therein about 0.32 weight percent of a polymer consisting of repeating units of vinyl sulfonic acid alkoxylated with 39 weight percent of glycidol and having a number average molecular weight of about 142,000 is injected via the injection well into the formation at a pressure of about 1300 psig and at the rate of 1.1 barrels per minute. Injection of the drive fluid is continued at the rate of 1.1 barrels per minute and at the end of 73 days the rate of production of oil is substantially greater than with water injection alone.

The sodium, potassium and ammonium salts of the above mentioned alkoxylated vinyl sulfonic acid polymers are also useful as thickeners for the drive fluids employed in the process of this invention.

What is claimed is:

1. A process for recovering hydrocarbons from a subterranean hydrocarbon-bearing formation penetrated by an injection well and a production well which comprises:
   (A) injecting into the formation via an injection well a drive fluid comprising water having dissolved therein about 0.01 to about 5.0 weight percent of a water-soluble polymer consisting of repeating units of vinyl sulfonic acid alkoxylated with about 2 to 200 weight percent of 2,3-epoxy-1-propanol, (B) forcing the said fluid through the formation, and
(C) recovering hydrocarbons through the production well, and wherein the number average molecular weight of the said water-soluble polymer is about 10,000 to about 2,000,000.

2. The process of claim 1 wherein the said drive fluid contains a surfactant.

3. The process of claim 1 wherein the said drive fluid is saturated with carbon dioxide at a pressure of about 300 to about 3000 psig.

4. The process of claim 1 wherein the said drive fluid is saturated with natural gas at a pressure of about 300 to about 3000 psig.

5. The process of claim 1 wherein the said drive fluid includes about 0.005 to 0.3 weight percent of an alkaline agent selected from the group consisting of sodium hydroxide, potassium hydroxide and sodium hypochlorite.

6. A fluid comprising water having dissolved therein about 0.01 to about 5.0 weight percent of a water-soluble polymer consisting of repeating units of vinyl sulfonic acid alkoxylated with about 2 to about 100 weight percent of 2,3-epoxy-1-propanol, and wherein the number average molecular weight of the said water-soluble polymer is about 10,000 to about 2,000,000.

7. The fluid of claim 6 saturated with carbon dioxide at a pressure of about 300 to about 3000 psig.

8. The fluid of claim 6 saturated with natural gas at a pressure of about 300 to about 3000 psig.

9. The fluid of claim 6 wherein about 0.005 to about 0.3 weight percent of an alkaline agent selected from the group consisting of sodium hydroxide, potassium hydroxide and sodium hypochlorite is included.

10. The fluid of claim 6 wherein about 0.001 to about 1.0 weight percent of a surfactant selected from the group consisting of alkylaryl sulfonates and alkyl polyethoxylated sulfates is included.

* * * * *